United States Patent
Morgillo et al.

(10) Patent No.: US 9,816,543 B2
(45) Date of Patent: Nov. 14, 2017

(54) ASSEMBLY WITH A CLIP CONNECTION

(71) Applicant: Mahle International GmbH, Stuttgart (DE)

(72) Inventors: Ivano Morgillo, Neuhuetten (DE); Winfried Brand, Stuttgart (DE); Thomas Hausner, Stuttgart (DE)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 15/301,369

(22) PCT Filed: Mar. 30, 2015

(86) PCT No.: PCT/EP2015/056903
§ 371 (c)(1),
(2) Date: Sep. 30, 2016

(87) PCT Pub. No.: WO2015/150329
PCT Pub. Date: Oct. 8, 2015

(65) Prior Publication Data
US 2017/0108025 A1    Apr. 20, 2017

(30) Foreign Application Priority Data
Apr. 2, 2014 (DE) .......................... 10 2014 206 255

(51) Int. Cl.
*F16B 13/06* (2006.01)
*F16B 21/06* (2006.01)
*F16B 21/07* (2006.01)

(52) U.S. Cl.
CPC .......... *F16B 21/065* (2013.01); *F16B 21/071* (2013.01)

(58) Field of Classification Search
CPC .... F16B 5/0664; F16B 13/06; F16B 13/0841; F16B 13/0858; F16B 13/126;
(Continued)

(56) References Cited

U.S. PATENT DOCUMENTS 623,809 A * 4/1899 McCreery ............. F16B 13/126
                                                                      411/57.1
2,941,439 A * 6/1960 Rapata ................ F16B 19/1081
                                                                      411/41
(Continued)

FOREIGN PATENT DOCUMENTS

DE        1284169 B    11/1968
DE        19619164 A1  11/1997
(Continued)

OTHER PUBLICATIONS

English abstract for DE-19619164.
English abstract for DE-202006012260.

*Primary Examiner* — Roberta Delisle
(74) *Attorney, Agent, or Firm* — Fishman Stewart PLLC

(57) ABSTRACT

A clip connection for coupling at least two components together, e.g., for fastening a first component to a second component in a joining direction, may include a plug-in pin arranged on the first component and having a longitudinal center axis extending parallel to the joining direction. The pin may include a conical longitudinal section that tapers in the joining direction. A radially resilient engagement hook may be provided engageable with an engagement contour. A sleeve may be arranged on the second component and have a longitudinal center axis extending parallel to the joining direction. The sleeve may include a plurality of radially resilient spring elements having a free end that supports the plurality of spring elements on the conical longitudinal section of the pin under radial preload when the sleeve and the pin are plugged together. The pin may be pluggable into the sleeve in the joining direction.

20 Claims, 4 Drawing Sheets

(58) Field of Classification Search
CPC ...... F16B 13/128; F16B 21/06; F16B 21/065; F16B 21/071; F16B 21/076; F16B 21/088
USPC .......................... 411/44, 54, 54.1, 57.1, 508
See application file for complete search history.

(56) References Cited

U.S. PATENT DOCUMENTS

| | | | |
|---|---|---|---|
| 3,205,759 A | 9/1965 | Texier | |
| 4,012,155 A * | 3/1977 | Morris | F16B 7/0413 24/625 |
| 4,276,806 A * | 7/1981 | Morel | F16B 19/1081 411/15 |
| 4,426,181 A | 1/1984 | Omata | |
| 4,927,287 A | 5/1990 | Ohkawa et al. | |
| 4,987,639 A * | 1/1991 | Baiuley | B65D 25/2858 16/222 |
| 5,005,265 A * | 4/1991 | Muller | F16B 21/07 24/289 |
| 5,112,156 A * | 5/1992 | Boyer | F16B 7/0413 403/287 |
| 5,143,500 A | 9/1992 | Schuring et al. | |
| 5,259,689 A * | 11/1993 | Arand | F16B 21/065 403/16 |
| 5,616,052 A * | 4/1997 | Pan | F16B 37/043 411/182 |
| 6,123,492 A | 9/2000 | Pickard | |
| 6,364,586 B1 | 4/2002 | Okada | |
| 2003/0059271 A1* | 3/2003 | Chou | F16B 13/0858 411/54.1 |
| 2004/0081529 A1* | 4/2004 | Stanton | F16B 19/109 411/44 |
| 2007/0253794 A1* | 11/2007 | Zhang | F16B 5/0642 411/45 |
| 2013/0039716 A1* | 2/2013 | McClure | F16B 13/06 411/80.1 |
| 2013/0180097 A1 | 7/2013 | Serrada Iranzo et al. | |

FOREIGN PATENT DOCUMENTS

| | | |
|---|---|---|
| DE | 202006012260 U1 | 11/2006 |
| DE | 202009013177 U1 | 2/2010 |
| DE | 102010048956 A1 | 4/2012 |
| EP | 0871825 A2 | 10/1998 |

* cited by examiner

ASSEMBLY WITH A CLIP CONNECTION

CROSS-REFERENCE TO RELATED APPLICATIONS

This application claims priority to German Patent Application No. 10 2014 206 255.1, filed Apr. 2, 2014, and International Patent Application No. PCT/EP2015/056903, filed Mar. 30, 2015, both of which are hereby incorporated by reference in their entirety.

TECHNICAL FIELD

The present invention relates to a clip connection for fastening without tools a first component to a second component in a joining connection. The invention additionally relates to an assembly, in particular of a vehicle, in which at least two components are fastened to one another by means of at least one such clip connection.

BACKGROUND

Clip connections are widely distributed and are mainly used in particular when as part of as simple and economical as possible an assembly two components have to be fastened to one another. Particularly practical clip connections are usable without tools which extremely simplifies their handling.

A clip connection comprises at least one plug-in pin with the help of which a first component can be fixed to a second component. To this end, the plug-in pin passes through an opening in the first component and an opening in the second component aligned with the former, wherein the plug-in pin with a head supports itself on the first component and engages on the second component with engagement elements. It is likewise possible to fasten the plug-in pin fixed on the first component so that during the joining the plug-in pin merely has to be plugged into the opening of the second component. In addition to such simple, one-piece clip connections there also exist multi-piece clip connections, which in addition to the plug-in pin comprise a sleeve into which the plug-in pin can be plugged in the joining direction. With such multi-piece clip connections, one-sided clip connections and two-sided clip connections can be distinguished. Examples for one-sided clip connections are known from U.S. Pat. No. 4,276,806, U.S. Pat. No. 4,927,287 and U.S. Pat. No. 6,364,586 B1. With these known multi-piece, one-sided clip connections, the sleeve is initially plugged through an opening in the first component and an opening in the second component that is aligned with the former, until engagement elements of the sleeve engage on the second component. At the same time, a collar of the sleeve lies against the first component. With the help of the plug-in pin, this engagement connection can now be locked in that the plug-in pin is plugged into the sleeve in the joining direction. Because of this, the plug-in pin locks the radially resilient engagement element of the sleeve. The plug-in pin in turn can comprise engagement elements which then engage with a corresponding engagement contour of the sleeve. Such multi-piece plug connections are one-sided, since both originate from the first component and bring about a locked engagement with the second component.

In contrast with this, the plug-in pin and the sleeve, in the case of a multi-piece, two-sided clip connection, are arranged on different components. Such two-sided clip connections require more effort on the component side but facilitate the assembly.

Independently of the one-piece or multi-piece as well as independently of the one-sided or two-sided configuration of the respective clip connection there is the basic problem with each clip connection that the radially resilient engagement elements have to be moved in the joining direction slightly beyond the associated engagement contour so that they can engage with the engagement contour. Because of this, conventional clip connections of necessity have axial play. Such axial play however cannot be tolerated in a plurality of assemblies so that no clip connections are used there.

SUMMARY

The present invention deals with the problem of stating an improved embodiment for a clip connection which is characterized in particular by reduced axial play and preferentially by eliminated axial play.

According to the invention, this problem is solved through the subjects of the independent claims. Advantageous embodiments are subject of the dependent claims.

The invention is based on the general idea with a two-sided multi-piece clip connection, to equip the plug-in pin with a conical longitudinal section which tapers towards the engagement hooks in the joining direction. The associated sleeve is equipped with radially resilient spring elements which in the connected state of the clip connection axially support themselves on the aforementioned conical longitudinal section of the plug-in pin. The clip connection additionally comprises multiple engagement hooks which are radially resilient with respect to the joining direction and at least one engagement contour configured corresponding to the engagement hooks for engaging the engagement hooks. Here, the engagement hooks engage with the respective engagement contour when the plug-in pin is plugged into the sleeve deep enough. The engagement hooks can be arranged on the plug-in pin so that the respective engagement contour can then be provided on the sleeve or on the second component comprising the sleeve. A converse design is also conceivable, in the case of which the engagement hooks are arranged on the sleeve while the respective engagement contour is provided on the plug-in pin or on the first component comprising the plug-in pin.

Furthermore, these spring elements are matched to the conical longitudinal section so that they lie against the same under radial preload while the engagement hooks axially lie against the respective engagement contour. The radial preload of the spring element results in an axial preload of the entire sleeve in the joining direction or in an axial preload of the plug-in pin against the joining direction. Thus, the engagement hooks are axially preloaded or pressed against the engagement contour. Through the interaction of the spring elements and the conical longitudinal section, any axial play between the engagement hooks and the respective engagement contour is thus eliminated so that the clip connection introduced here is axially free of play. Accordingly, the clip connection introduced here can also be employed with assemblies in the case of which components have to be fastened to one another without play.

Preferred is an embodiment in which the engagement hooks are integrally moulded on the plug-in pin distally from the first component while the respective engagement contour is integrally moulded on the sleeve or on the second component. Because of this, the clip connection has a structure that can be produced in a particularly simple manner.

According to an advantageous embodiment, the plug-in pin can have a cylindrical longitudinal section from the free face end of which the engagement hooks originate and which adjoins the conical longitudinal section. Because of this, the plug-in pin has a structure that can be produced in a particularly simple manner. Preferred in this case is an embodiment in the case of which exactly two engagement hooks are provided, which with respect to the longitudinal centre axis of the plug-in pin are located diametrically opposite one another. However, three or more engagement hooks can also be provided in principle.

According to an advantageous further development, the sleeve in its interior can comprise at least one axial stop which axially interacts with the aforementioned face end of the cylindrical longitudinal section of the plug-in pin in order to delimit to a predetermined value a plug-in depth for the plug-in pin with which the plug-in pin can be plugged into the sleeve. Here, the respective axial stop and the face end are matched to one another so that between the respective axial stop and the face end an axial distance is present when the engagement hooks axially lie against the respective engagement contour. Through this measure, plugging the plug-in pin too deeply into the sleeve is prevented as a result of which for example the risk of damaging the spring elements can be reduced.

With another embodiment, the spring elements can be arranged distributed on the sleeve in the circumferential direction, wherein the spring elements axially project from the sleeve and are separated from one another in the circumferential direction by way of axial slots. Because of this, the spring elements can radially move independently of one another in order to create the radial preload with respect to the conical longitudinal section.

In the case of another advantageous embodiment, the free ends of the spring element can form a chamfered insertion region of the sleeve. During the assembly, the plug-in pin is plugged into the sleeve in the region of the free ends of the spring elements. Through the insertion region provided there, the inserting of the plug-in pin into the sleeve is simplified.

According to another embodiment, a common engagement contour for all engagement hooks can be provided on the sleeve which is formed by a face end of the sleeve. Because of this, the sleeve has a structure that can be produced in a particularly simple manner.

According to another embodiment, the sleeve in its interior can comprise guide grooves for axially guiding the engagement hooks during the plug-in pin operation. With the help of such guide grooves it can be ensured that the plug-in pin can be properly inserted into the sleeve only in a predetermined rotational position relative to the sleeve. Because of this, the assembly can be simplified.

According to another embodiment, the engagement hooks can be arranged on the sleeve while the respective engagement contour is arranged on the plug-in pin or on the first component. Practically, the engagement hooks are also moulded integrally on the sleeve. Likewise, the respective engagement contour can be integrally moulded on the plug-in pin or on the first component. This design is less compact but can be designed for greater forces of misuse, which are orientated opposite to the joining direction.

According to a further development, the engagement hooks can be arranged on the sleeve radially outside and extend parallel to the joining direction. In particular, the free ends of the engagement hooks and the free ends of the spring elements are orientated in the joining direction and face the first component because of this.

In another embodiment, a locking element can be provided in the sleeve which impedes or prevents radial disconnecting of the engagement hooks from the respective engagement contour. Such a locking element can be provided as a separate that is additional third component of the clip connection. Such a locking element can be plugged into the interior of the sleeve against the joining direction for example in the region of the engagement contour. Likewise it is possible, in principle, to configure the plug-in pin hollow so that the locking element, passing through the plug-in pin for example, is adjustable in the joining direction as far as into the region of the engagement contour. The locking element can also be adjustably mounted on the plug-in pin parallel to the joining direction. During the plug-in pin operation, the locking element is adjusted into an unlocking position, in which it does not interfere with the radial movability of the engagement hooks. Following the plug-in pin operation, i.e. following the engaging of the engagement hooks on the respective engagement contour, the locking element can be adjusted into a locking position in which it then prevents or at least impedes the radial adjustability of the engagement hooks.

Particularly advantageous is an embodiment, in which the plug-in pin is integrally moulded on the first component. Additionally or alternatively, the sleeve can be integrally moulded on the second component. By integrally moulding the plug-in pin on the first component or the sleeve material-uniformly on the second component, the plug-in pin is material-uniformly produced from one piece with the first component or the sleeve with the second component. For example, the plug-in pin and the first component are injection moulded from plastic. Likewise, the sleeve and the second component can also be injection moulded from plastic.

With an assembly according to the invention, which can be employed in particular with a vehicle, a first component and a second component are fastened to one another by means of at least one clip connection of the type described above. Provided that multiple clip connections of this type are employed simultaneously in order to fasten the first component to the second component it is practical to arrange all plug-in pins on the first component while all sleeves are arranged on the second component. In principle, however, a mixed design is also conceivable so that each component comprises at least one plug-in pin and at least one sleeve.

The one in particular first component can for example be a suction module for a fresh air system of an internal combustion engine, wherein in a suction module housing a flap arrangement for controlling fresh air ducts is arranged. The plug-in pins are integrally moulded for example on the module housing. The other, in particular second component can then for example be an actuating drive for actuating the flap arrangement. The sleeves in this case can be integrally moulded on a drive housing of the actuating drive. Thus, the actuating drive can be particularly easily fastened to the suction module without play with the help of the clip connections.

Further important features and advantages of the invention are obtained from the subclaims, from the drawings and from the associated figure description by way of the drawings.

It is to be understood that the features mentioned above and still to be explained in the following cannot only be used in the respective combination stated but also in other combinations or by themselves without leaving the scope of the present invention.

BRIEF DESCRIPTION OF THE DRAWINGS

Preferred exemplary embodiments of the invention are shown in the drawings and are explained in more detail in the following description, wherein same reference characters relate to same or similar or functionally same components.

The drawings shows, in each case schematically.

DETAILED DESCRIPTION

Figure 1:
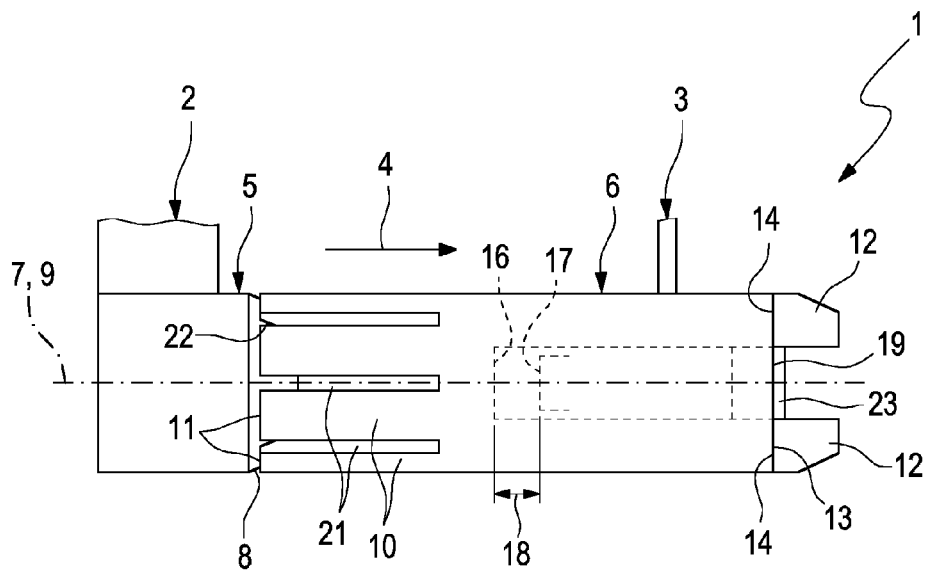
FIG. 1 a highly simplified lateral view of a clip connection in a plugged-in state, FIG. 2 a lateral view of a plug-in pin of the clip connection, FIG. 3 a lateral view of a sleeve of the clip connection, FIG. 4 an isometric view of an assembly, in which a first component and a second component are fastened to one another by means of multiple clip connections, FIG. 5 an isometric view as in FIG. 4, however with another embodiment of the clip connections, FIG. 6 an isometric view as in FIG. 5, however with absent second component.

According to FIG. 1, a clip connection 1, with the help of which a first component 2 can be fastened without tools to a second component 3 in a joining direction 4 indicated by an arrow, comprises a plug-in pin 5 that is arranged fixed on the first component 2 and a sleeve 6 that is arranged fixed on the second component 3. According to the FIGS. 1 and 2, a longitudinal centre axis 7 of the plug-in pin 5 runs parallel to the joining direction 4. The plug-in pin 5 comprises a conical longitudinal section 8 proximally with respect to the first component 2, which tapers with increasing distance from the first component 2 or in the joining direction 4.

Figure 3:
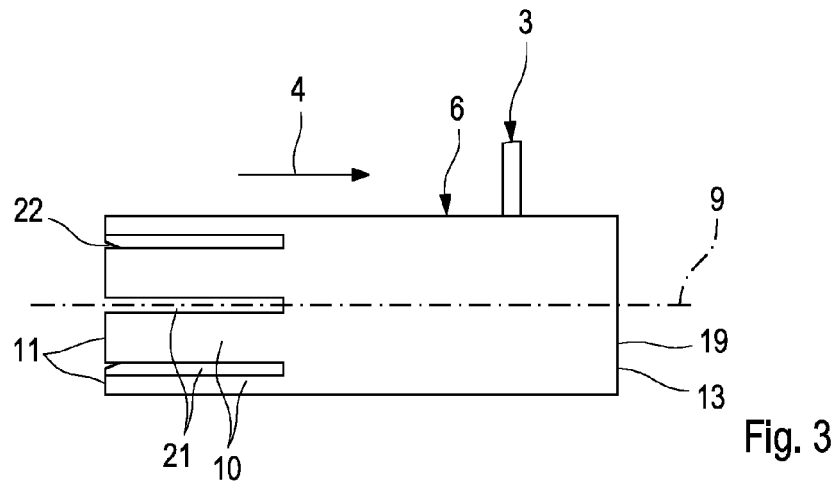

According to the FIGS. 1 and 3, a longitudinal centre axis 9 of the sleeve 6 runs parallel to the joining direction 4. Furthermore, the sleeve 6 comprises multiple radially resilient spring elements 10, which axially project from the sleeve 6. In the plugged state of FIG. 1, the spring elements 10 support themselves with their free ends 11, which are arranged distally from the sleeve 6, on the conical longitudinal section 8 of the plug-in pin 5 in such a manner that they lie against the same under radial preload. Through the conicity of the conical longitudinal section 8, the sleeve 6 is thereby driven in the joining direction 4 relative to the plug-in pin 5. As reaction thereto, the plug-in pin 5 is driven against the joining direction 4 relative to the sleeve 6.

Figure 2:
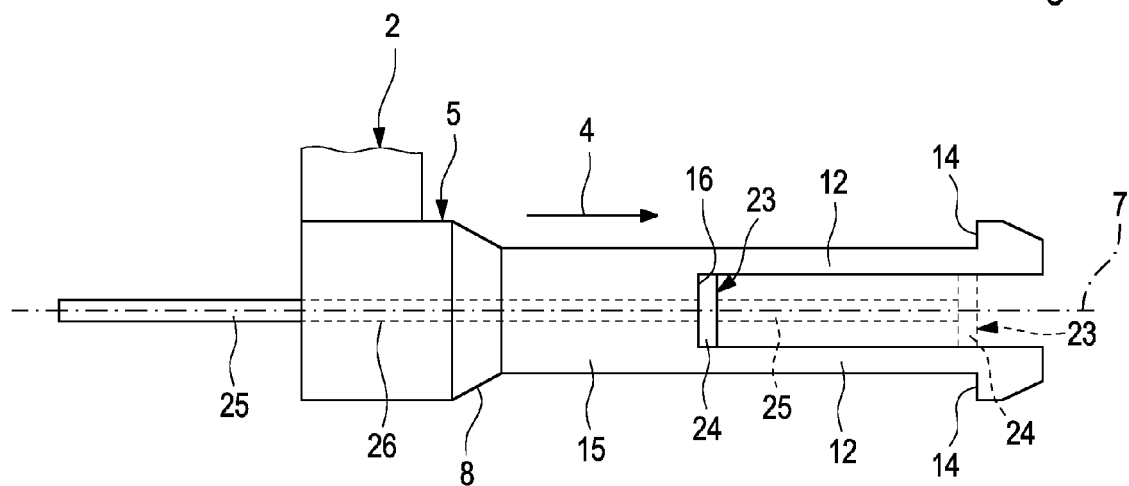

According to FIGS. 1 to 3, the clip connection 1 additionally comprises multiple radially resilient engagement hooks 12, which in the plugged-in state are engaged with at least one engagement contour 13 that is complementary to the former. Here, the engagement lugs 14 of the engagement hooks 12 radially engage behind said engagement contour 13 in such a manner that the engagement hooks 12 via their engagement lugs 14 support themselves opposite to the joining direction 4 on the engagement contour 13. Through the axial preload between sleeve 6 and plug-in pin 5, the engagement hooks 12 are axially preloaded for lying against the engagement contour 13. Accordingly, the clip connection 1 in the plugged state is axially free of play. In the embodiment shown in the FIGS. 1 to 4, the engagement hooks 12 are arranged on the plug-in pin 5 distally from the first component 2.

In particular, the engagement hooks 12 are integrally moulded on the plug-in pin 5. The respective engagement contour 13 in this case is integrally moulded on the sleeve 6. In principle, an embodiment is also conceivable in which the engagement contour 13 is formed on the second component 3. The plug-in pin 5 can thus be plugged into the sleeve 6 in the joining direction 4 with the engagement hooks 12 up front. In the process, the engagement hooks 12 penetrate an interior enclosed by the sleeve 6.

In the shown example of the FIGS. 1 to 4, the plug-in pin 5 comprises a cylindrical longitudinal section 15, from the free face end 16 of which the engagement hooks 12 project, and which axially adjoins the conical longitudinal section 8. The free face end 16 of the cylindrical longitudinal section 15 faces away from the conical longitudinal section 8. According to FIG. 1, the sleeve 6 can now comprise in its interior at least one axial stop 17 which is indicated by an interrupted line. The axial stop 17 in this case radially projects towards the inside between two engagement hooks 12 which are adjacent in the circumferential direction. Preferentially, exactly two engagement hooks 12 are provided which are arranged diametrically opposite one another. The respective axial stop 17 now radially projects into the gap between the two engagement hooks 12. Because of this, the axial stop 17 can axially interact with the face end 16 in order to limit a plug-in depth for the plug-in pin 5 to a predetermined value. Here, the respective axial stop 17 and the face end 16 are matched to one another so that in the plugged state shown in FIG. 1, in which the engagement hooks 12 with their engagement lugs 14 axially lie against the respective engagement contour 13, an axial distance 18 between the respective axial stop 17 and the face end 16 is present. In this way, a tolerable over-plugging of the plug-in pin 5 into the sleeve 6 is made possible.

In the embodiment shown in the FIGS. 1 to 4, a common engagement contour 13 is provided for all engagement hooks 12, which is formed by an axial face end 19 of the sleeve 6 facing away from the spring elements 10. Furthermore, the sleeve 6, with this embodiment, can comprise in its interior guide grooves which are not noticeable here for axially guiding the engagement hooks 12 during the plug-in operation. The guide grooves in this case are orientated parallel to the longitudinal centre axis 9 of the sleeve 6. The engagement hooks 12 radially engage in the guide grooves, as a result of which a slot and key guide is formed.

Figure 5:
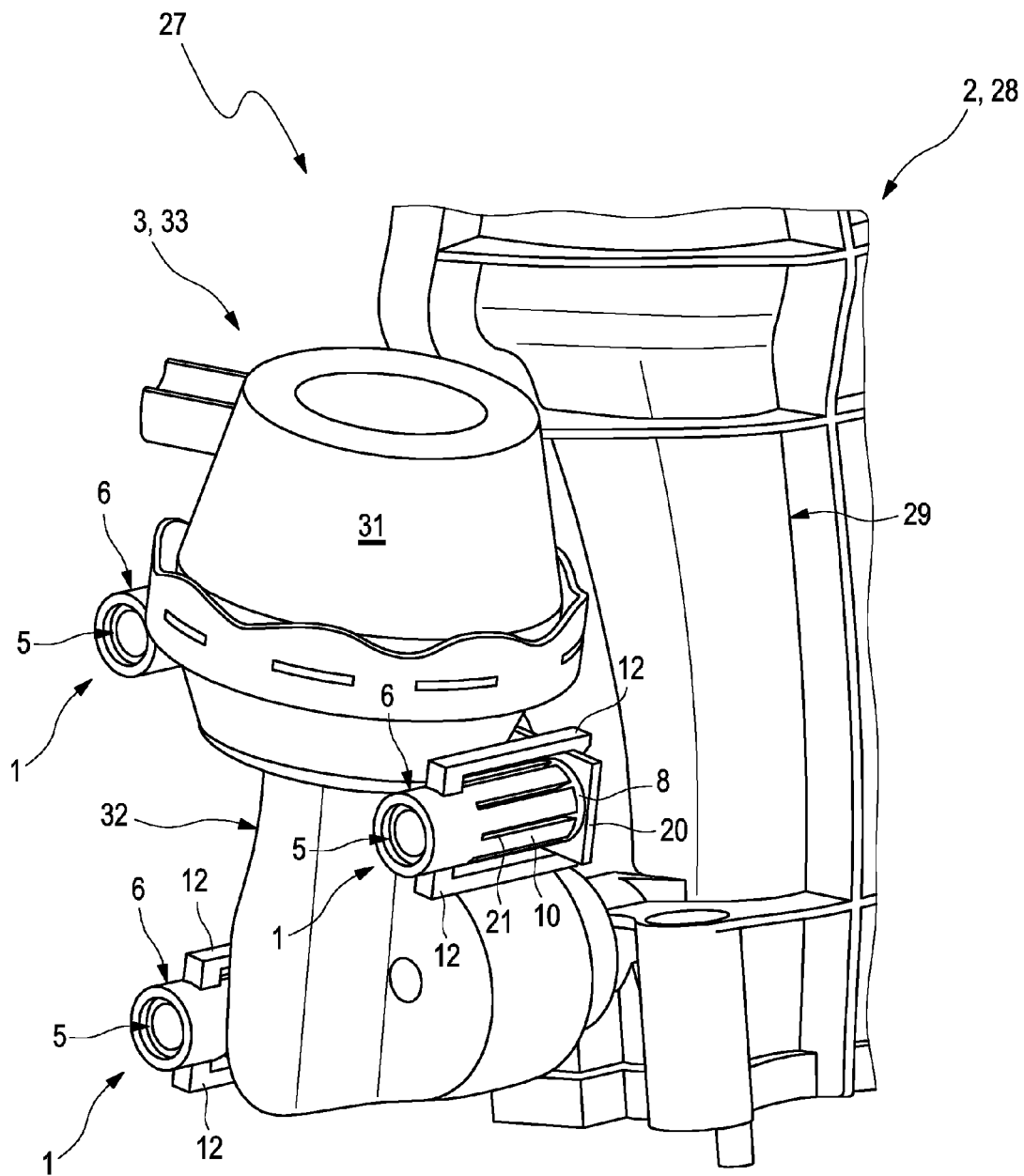
Figure 6:
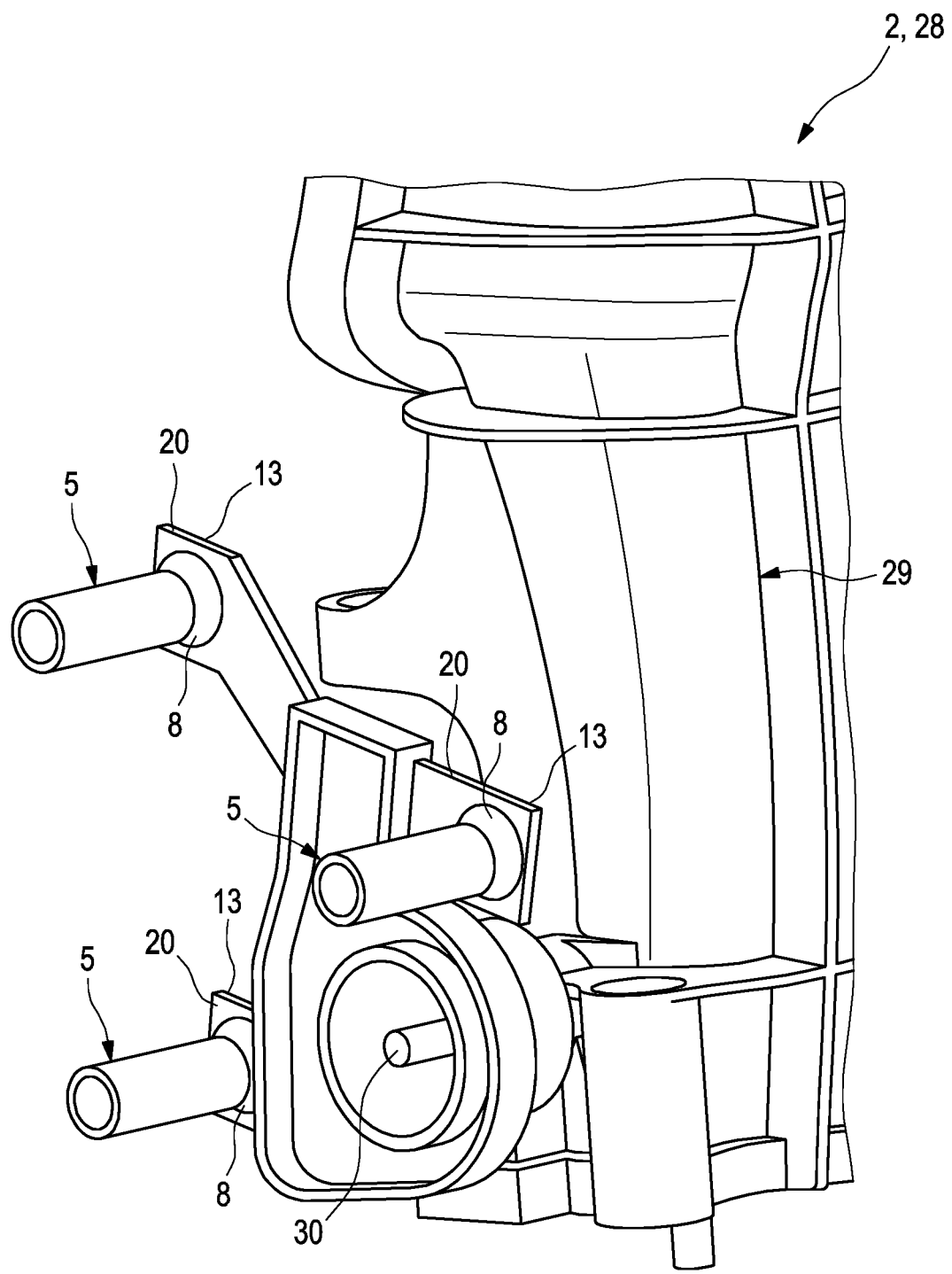

In the embodiment shown in the FIGS. 5 and 6, the engagement hooks 12 are arranged on the sleeve 6, in particular integrally moulded thereon. The respective engagement contour 13 in this case is arranged on the plug-in pin 5 or on the first component 2. Here, too, exactly two engagement hooks 12 are provided which are located diametrically opposite one another. The associated engagement contour 13 in the example is formed on a support 20 in each case, from which the plug-in pin 5 originates and which in this case forms an integral part of the first component 2. In this embodiment, the engagement hooks 12 are arranged on the sleeve 6 radially outside, while extending parallel to the joining direction 4.

In the embodiment shown in the FIGS. 5 and 6, the free ends 11 of the spring elements 10 and the free ends of the engagement hooks 12 carrying the engagement lugs 14 are orientated in the same direction, namely in each case in the joining direction 4. In contrast with this, it is provided in the embodiment shown in the FIGS. 1 to 4 that the free ends of the engagement hooks 12 are orientated opposite to the free ends 11 of the spring elements 10. While the free ends of the engagement hooks 12 extend in the joining direction 4, the free ends 11 of the spring elements 10 extend opposite to the joining direction 4.

With the embodiment shown in the FIGS. 5 and 6, the interaction of the spring elements 10 with the conical longitudinal section 8 also results in an elimination of the axial play between the plug-in pin 5 and sleeve 6, so that this clip connection 1 is also axially free of play.

In the case of the embodiment shown in the FIGS. 1 to 6, the spring elements 10 are arranged on the spring 6 distributed in the circumferential direction, wherein they axially project from the sleeve 6 in each case and are separated from one another in the circumferential direction by axial slots 21. Furthermore, the free ends 11 of the spring elements 11 are radially chamfered on the inside in order to form a chamfered insertion region 22 of the sleeve 6. This insertion region 22 simplifies inserting the plug-in pin 5 into the sleeve 6 during the plug-in operation.

According to the FIGS. 1 and 2, a locking element 23 can be provided which prevents or at least impedes a radial disconnecting of the engagement hook 12 from the respective engagement contour 13. In the example indicated in FIG. 1, the locking element 23 is a separate element subsequently inserted into the sleeve 6, which impedes the radial movability of the engagement hooks 12. This locking element 23 in this case is inserted into the sleeve 6 on the face end 19 facing away from the spring elements 10.

In contrast with this, another embodiment is indicated in FIG. 2, in the case of which such a locking element 23 is adjustably arranged on the plug-in pin 5. Here, an unlocking state and a locking state of the locking element 23 are indicated by a continuous line and an interrupted line respectively. In the unlocking state, a detent 24 of the locking element 23 lies for example against the face end 16 of the cylindrical section 15. In the locking state, the detent 24 by contrast is adjusted as far as into the region of the engagement lugs 14. Adjusting the detent 24 can be effected for example by means of a rod 25, which extends through a central opening 26 of the plug-in pin 5, so that the locking element 23 following the insertion of the plug-in pin 5 into the sleeve 6 and following the engagement of the engagement hooks 12 with the respective engagement contour in the joining direction 4 can be transferred into a locked position.

Figure 4:
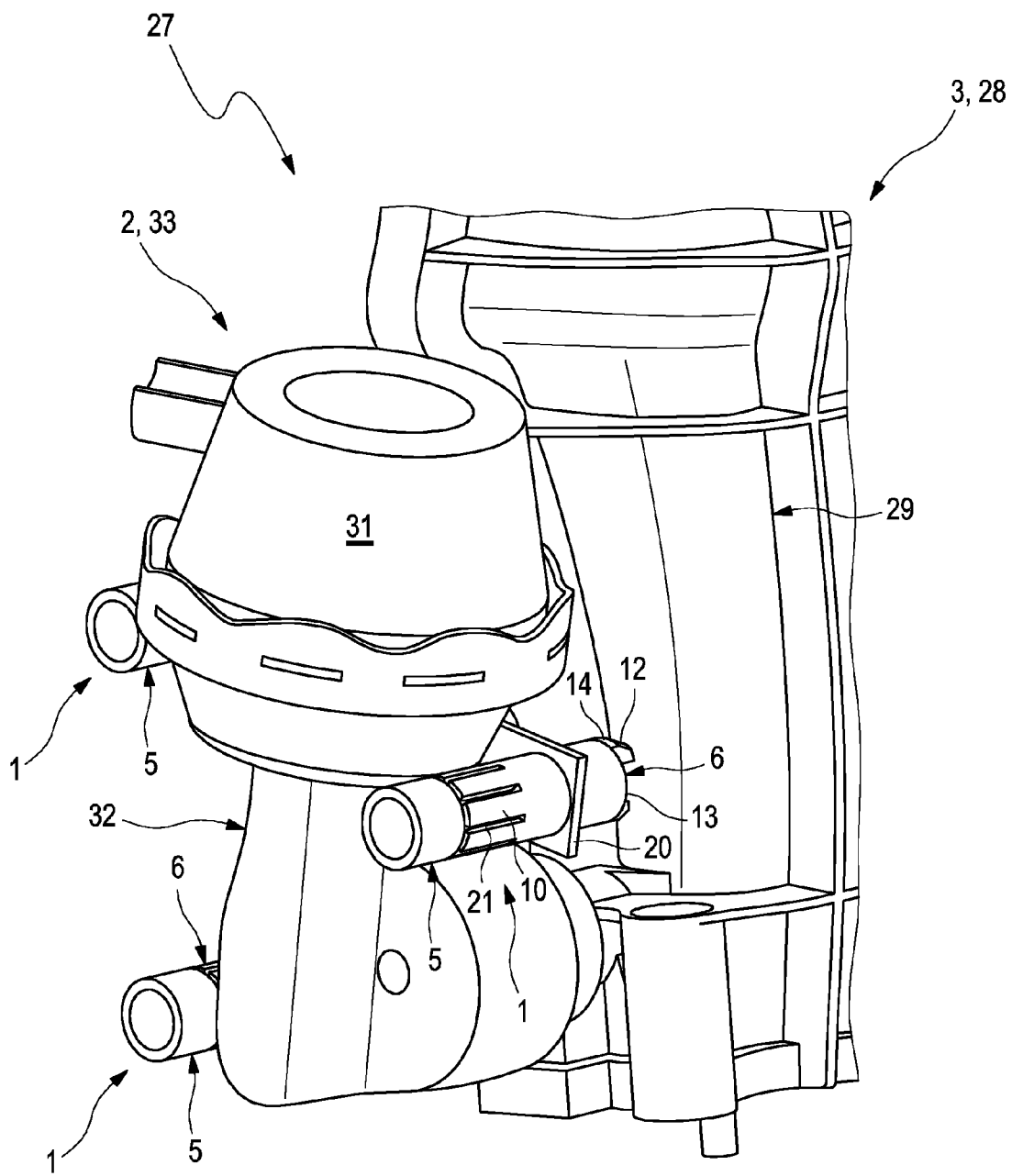

As is indicated in the FIGS. 4 to 6, the respective plug-in pin 5 is practically moulded integrally on the first component 2. In particular, the first component 2 is a one-piece injection moulded part produced from plastic. Similar applies also to the respective sleeve 6 which is preferably integrally moulded on the second component 3. The second component 3 is preferably also an injection moulded part produced in one piece, preferentially from plastic.

The FIGS. 4 to 6 show an assembly 27, which comprises at least the first component 2 and the second component 3. Here, the first component 2 and the second component 3 are connected to one another with the help of at least one clip connection 1 of the type mentioned above. In the examples of FIGS. 4 to 6, three clip connections 1 are provided in each case in order to fasten the two components 2, 3 to one another.

The one component is purely exemplarily a suction module 28, which in a suction module housing 29 comprises a flap arrangement, of which a flap shaft 30 is noticeable only in FIG. 6. By turning the flap shaft 30, multiple flaps for controlling fresh air ducts are adjusted within the module housing 29. In the example shown in FIG. 4, the suction module 28 forms the second component 3 which comprises the sleeves 6. In contrast with this, FIGS. 5 and 6 show an example in the case of which the suction module 28 forms the first component 2, which comprises the plug-in pins 5.

On the module housing 29, a support 20 is formed for each clip connection 1, which in the region of FIGS. 5 and 6 in each case comprises a plug-in pin 5 with conical longitudinal section 8. In the example of FIG. 4, by contrast, the sleeve 6 is arranged on the support 20, while the spring elements 10 are located distally from the support 20. The other component in the present example is an actuating device 33, which comprises for example a pressure capsule 31. On an actuating device housing 32, the plug-in pins 5 (FIG. 4) or the sleeves 6 (FIGS. 5 and 6) are arranged in each case depending on embodiment. In the example of FIG. 4, the actuating device thus forms the first component 2 while in the example of FIGS. 5 and 6 it forms the first component 3.

Accordingly, in the embodiment shown in FIG. 4, seemingly kinematically reversed with respect to the embodiment shown in the FIGS. 5 and 6, the sleeves 6 are arranged on the suction module housing 29 and the plug-in pins 5 on the actuating device housing 32. Accordingly, the actuating device 33 in the example of FIG. 4 forms the first component 2, while the second component 3 is formed by the suction module 28.

With the help of the clip connections 1, the two components 2, 3, i.e. actuating device 33 and suction module 28, can be fastened to one another without tools, wherein in addition any play in the joining direction 4 can be additionally eliminated.

The invention claimed is:

1. A clip connection for coupling at least two components together, comprising:
   a plug-in pin arranged fixed on a first component and having a longitudinal centre axis extending parallel to a joining direction, the plug-in pin including a conical longitudinal section that tapers in the joining direction;
   a radially resilient engagement hook engageable with at least one engagement contour; and
   a sleeve arranged fixed on a second component and having a longitudinal centre axis extending parallel to the joining direction, the sleeve including a plurality of radially resilient spring elements having a free end supporting the plurality of spring elements on the conical longitudinal section of the plug-in pin under radial preload when the plug-in pin and the sleeve are plugged together;
   wherein the plug-in plug is pluggable into the sleeve in the joining direction.

2. The clip connection according to claim 1, wherein at least one of:
   the engagement hook is integrally moulded on the plug-in pin spaced from the conical longitudinal section;
   the at least one engagement contour is integrally moulded on the sleeve or on the second component; and
   the plug-in pin includes the engagement hook disposed on a leading end with respect to the joining direction and pluggable into the sleeve.

3. The clip connection according to claim 1, wherein the plug-in pin further includes a cylindrical longitudinal section having a free face end, wherein the engagement hook extends from the free face end of the cylindrical longitudinal section and the cylindrical longitudinal section adjoins the conical longitudinal section.

4. The clip connection according to claim 3, wherein the sleeve defines an interior including at least one axial stop, the at least one axial stop axially interacts with the free face end to delimit a plug-in depth for the plug-in pin when the plug-in pin and the sleeve are plugged together, and wherein an axial distance is provided between the at least one axial stop and the free face end when the engagement hook axially engages against the at least one engagement contour.

5. The clip connection according to claim 1, further comprising a plurality of engagement hooks extending from the plug-in pin along the longitudinal centre axis, wherein the at least one engagement contour is common to all of the plurality of engagement hooks, and the at least one engagement contour is defined by a face end of the sleeve.

6. The clip connection according to claim 1, wherein the sleeve defines an interior including a guide groove for axially guiding the engagement hook when plugging the plug-in pin into the sleeve.

7. The clip connection according to claim 1, wherein at least one of:
the engagement hook is arranged on the sleeve; and
the at least one engagement contour is arranged on the plug-in pin or on the first component.

8. The clip connection according to claim 7, wherein the engagement hook is arranged on the sleeve on a radially outside and extends parallel to the joining direction.

9. The clip connection according to claim 1, wherein the plurality of spring elements are arranged on the sleeve distributed in a circumferential direction, the plurality of spring elements projecting axially from the sleeve and separated from one another in the circumferential direction by a respective axial slot.

10. The clip connection according to claim 1, wherein the free end of the plurality of spring elements defines a chamfered insertion region of the sleeve.

11. The clip connection according to claim 1, further comprising a locking element structured to impede radial disconnect of the engagement hook from the at least one engagement contour.

12. The clip connection according to claim 11, wherein the locking element is plugged into an interior of the sleeve in a region of the at least one engagement contour against the joining direction.

13. The clip connection according to claim 11, wherein the plug-in pin is configured hollow and the locking element is passable through the plug-in pin, and wherein the locking element is adjustable in the joining direction as far as into a region of the engagement contour.

14. The clip connection according to claim 11, wherein the locking element is adjustably mounted on the plug-in pin parallel to the joining direction.

15. The clip connection according to claim 11, wherein the locking element is adjustably arranged on the plug-in pin between an unlocking position, in which the locking element facilitates a radial movability of the engagement hook disposed on the plug-in pin, and a locking position, in which the locking element impedes the radial movability of the engagement hook.

16. The clip connection according to claim 15, further comprising a detent, wherein the detent is arranged in an engagement region of the engagement hook with the at least one engagement contour when the locking element is in the locking position to impede the radial movability of the engagement hook, and the detent is arranged spaced from the engagement region of the engagement hook with the at least one engagement contour to facilitate the radial movability of the engagement hook when the locking element is in the unlocking position.

17. The clip connection according to claim 16, wherein the locking element includes a rod fixedly connected with the detent and extending through a central opening of the plug-in pin so that the detent and the locking element are transferable into the locking position when the plug-in pin is plugged together with the sleeve and the engagement hook engages with the at least one engagement contour in the joining direction.

18. The clip connection according to claim 1, wherein the plug-in pin is integrally moulded on the first component.

19. The clip connection according to claim 1, wherein the sleeve is integrally moulded on the second component.

20. A joint assembly, comprising:
a first component and a second component;
a clip connection coupling the first component and the second component together in a joining direction, the clip connecting including:
a plug-in pin securable to the first component and having a longitudinal centre axis extending parallel to the joining direction, the plug-in pin including a conical longitudinal section that tapers in the joining direction;
a radially resilient engagement hook engageable with at least one engagement contour; and
a sleeve securable to the second component and having a longitudinal centre axis extending parallel to the joining direction, the sleeve including a plurality of radially resilient spring elements having a free end supporting the plurality of spring elements on the conical longitudinal section of the plug-in pin under radial preload when the plug-in pin and the sleeve are plugged together;
wherein the plug-in plug is pluggable into the sleeve in the joining direction.

* * * * *